(12) United States Patent
Williams et al.

(10) Patent No.: US 7,636,431 B2
(45) Date of Patent: Dec. 22, 2009

(54) METHOD AND APPARATUS FOR SUBSCRIBER CONTROL OF AN INBOUND CALL

(76) Inventors: L. Lloyd Williams, 15 Brodeur Crescent, Kanata, Ontario (CA) K2L 1Z2; Michael Kahnert, 484A Richardson Avenue, Ottawa, Ontario (CA) K2B 5H1

( * ) Notice: Subject to any disclaimer, the term of this patent is extended or adjusted under 35 U.S.C. 154(b) by 637 days.

(21) Appl. No.: 10/806,135

(22) Filed: Mar. 23, 2004

(65) Prior Publication Data
US 2005/0213740 A1 Sep. 29, 2005

(51) Int. Cl.
*H04M 7/00* (2006.01)

(52) U.S. Cl. .............. 379/221.13; 379/207.02; 379/210.01

(58) Field of Classification Search .......... 379/207.02, 379/221.13; 455/414; 705/202
See application file for complete search history.

(56) References Cited

U.S. PATENT DOCUMENTS

| | | | |
|---|---|---|---|
| 5,668,862 A * | 9/1997 | Bannister et al. ........ | 379/207.14 |
| 6,005,870 A | 12/1999 | Leung et al. ............... | 370/466 |
| 6,018,737 A | 1/2000 | Shah et al. ................... | 707/10 |
| 6,044,144 A * | 3/2000 | Becker et al. .......... | 379/265.02 |
| 6,055,305 A * | 4/2000 | Norman et al. .......... | 379/211.01 |
| 6,058,305 A | 5/2000 | Chavez, Jr. ................ | 455/426 |
| 6,097,801 A * | 8/2000 | Williams et al. ........ | 379/221.13 |
| 6,154,646 A | 11/2000 | Tran et al. ................... | 455/417 |
| 6,160,880 A | 12/2000 | Allen ........................ | 379/207 |
| 6,167,256 A | 12/2000 | Ylä-Outinen et al. ....... | 455/417 |
| 6,246,889 B1 | 6/2001 | Boltz et al. ................ | 455/567 |
| 6,253,075 B1 | 6/2001 | Beghtol et al. .............. | 455/415 |
| 6,259,782 B1 | 7/2001 | Gallant ...................... | 379/211 |
| 6,301,338 B1 | 10/2001 | Mäkelä et al. ............ | 379/88.21 |
| 6,408,177 B1 * | 6/2002 | Parikh et al. ............. | 455/414.4 |
| 6,434,226 B1 | 8/2002 | Takahashi .................... | 379/201 |
| 6,459,780 B1 | 10/2002 | Wurster et al. ......... | 379/142.02 |
| 6,631,182 B1 | 10/2003 | Schwab et al. ........... | 379/88.19 |
| 6,657,992 B1 | 12/2003 | Christie, IV ................ | 370/352 |

(Continued)

FOREIGN PATENT DOCUMENTS

EP 0 663 128 B1 5/2003

OTHER PUBLICATIONS

"True Number Portability and Advanced Call Screening in a SIP-Based IP Telephony System", (Dalgic et al.)-IEEE Communications Magazine, Jul. 1999 vol. 37, Issue 7 pp. 96-101 ISSN:0163-6804.

*Primary Examiner*—Ahmad F Matar
*Assistant Examiner*—Khai N Nguyen

(57) ABSTRACT

Service subscriber inbound call control is effected from within a public switched telephone network (PSTN) using a Call Service Node (CSN). On receipt of a call directed to the service subscriber, at least one messaging network message is sent to the service subscriber to request a call treatment option. Pending receipt of a reply from the subscriber, the call is routed by the CSN to a call parking facility in the PSTN. The call parking facility may be a voice mail box of the subscriber or an announcement facility. After a call treatment option is received, the call is released from the call parking facility the call treatment is effected. The service enables single number service for multiple service subscriber directory numbers, unified voice mail for multiple service subscriber telephone numbers, or segregated voice mail boxes for a single service subscriber number, as well as real-time, interactive inbound call screening.

28 Claims, 10 Drawing Sheets

U.S. PATENT DOCUMENTS 6,697,461 B1 2/2004 Middleswarth et al. .. 379/88.24
2004/0013255 A1* 1/2004 Williams et al. ....... 379/207.02
2005/0201533 A1* 9/2005 Emam et al. ............. 379/88.19

* cited by examiner

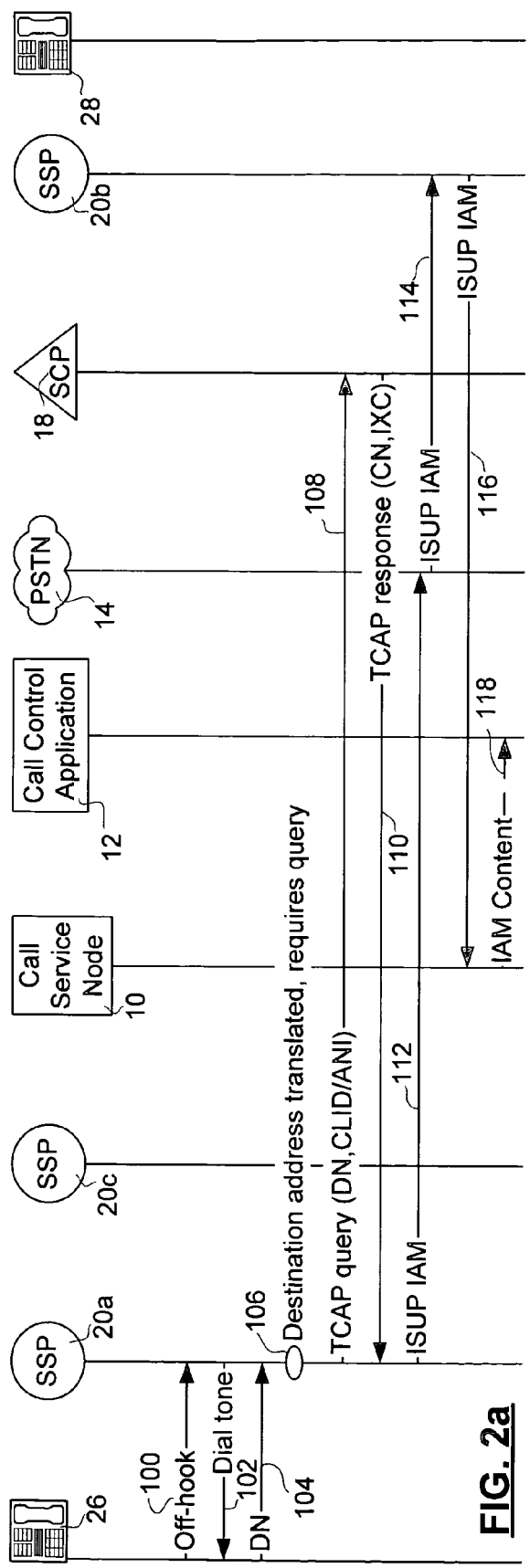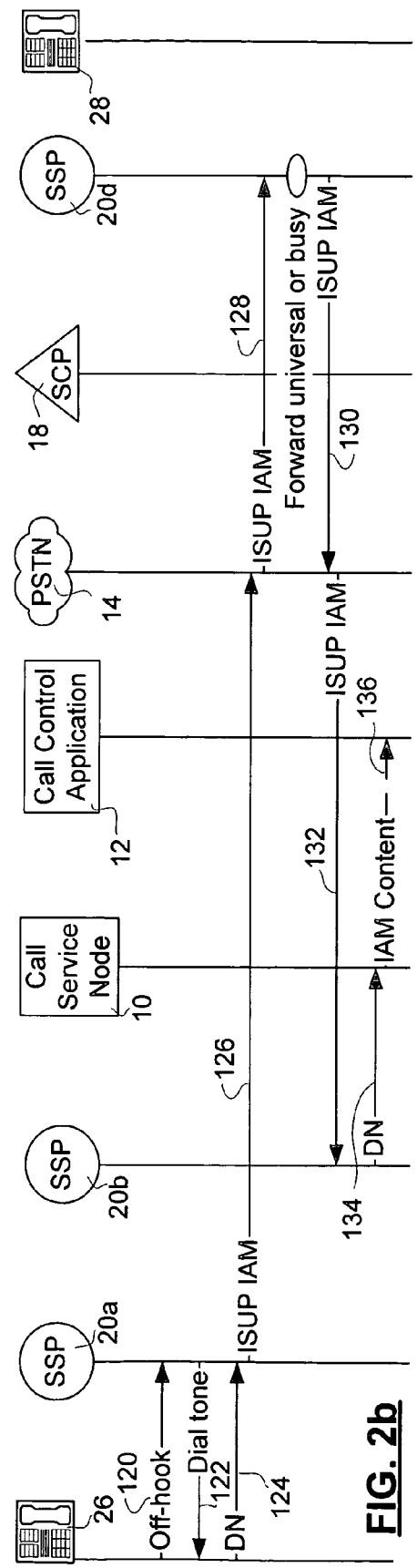

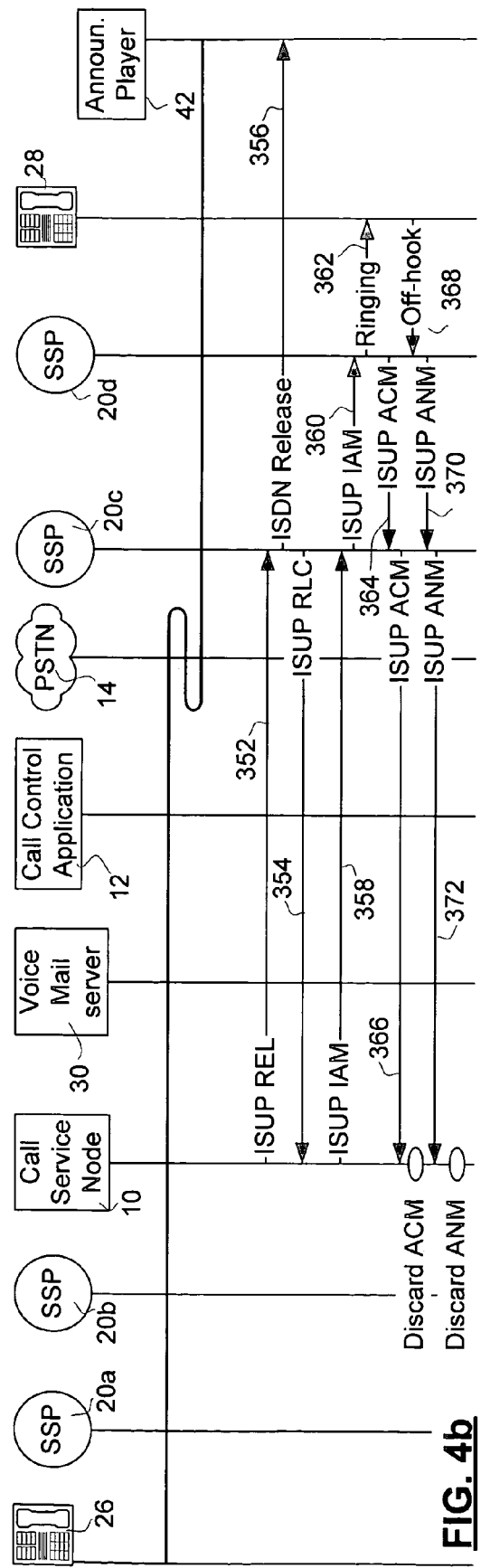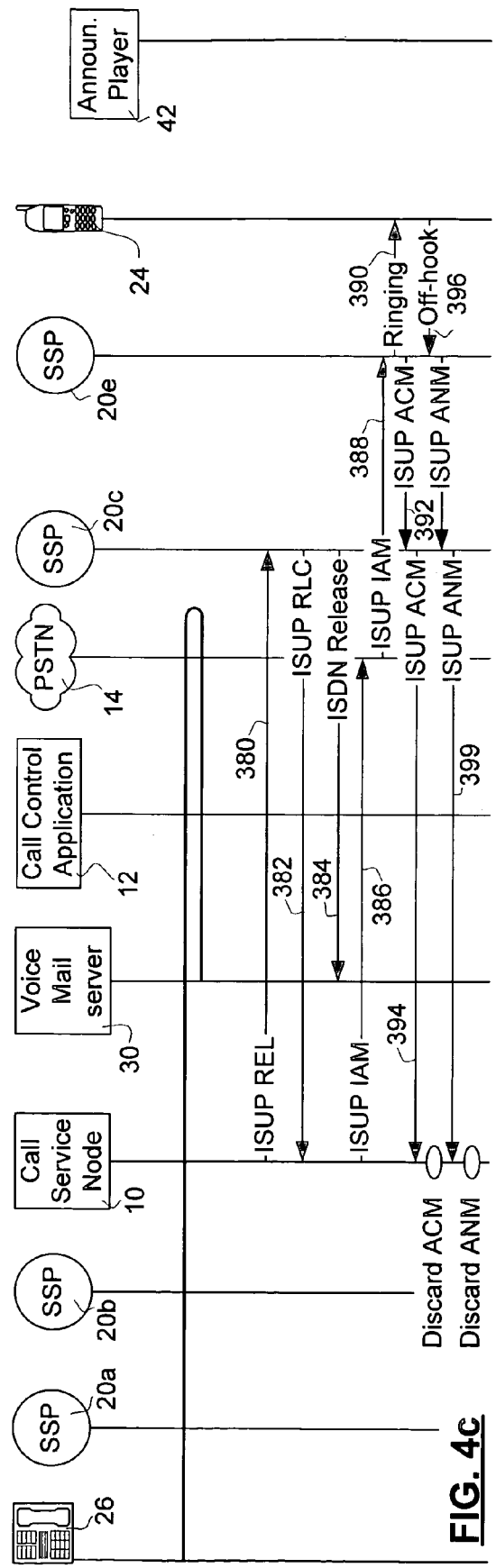

METHOD AND APPARATUS FOR SUBSCRIBER CONTROL OF AN INBOUND CALL

CROSS-REFERENCE TO RELATED APPLICATIONS

This is the first application filed for the present invention.

MICROFICHE APPENDIX

Not Applicable.

TECHNICAL FIELD

The invention generally relates to enhanced telephone services, and in particular, relates to subscriber control of inbound calls.

BACKGROUND OF THE INVENTION

Telephone service subscribers are desirous of having more and better control over incoming telephone calls in order to reduce the occurrence of missed calls, identify incoming calls when on the telephone, receive calls at a telephone of choice, dismiss nuisance calls, or the like.

Generally, for telephone subscribers who do not subscribe to a call screening service, if a call is made to a telephone, and the call is not answered (or some other subscriber-specified criterion is met), the call may be forwarded to a voice mail system. The voice mail system may be provided by a voice mail server or by a peripheral of a switch in a public switched telephone network (PSTN) handling the call, for example. Unfortunately it is not currently possible for the subscriber to monitor or connect a caller who has been forwarded to such voice mail systems except through that specific peripheral. This forces massive upgrades to each of the peripherals to support the functionality.

Inbound call screening services are available, however, to both wireline and wireless telephone service subscribers to permit subscribers to screen incoming calls.

A service adapted for wireline subscribers is taught in U.S. Pat. No. 6,459,780 entitled METHODS AND APPARATUS FOR PROVIDING A CALLED PARTY CALL DISPOSITION OPTIONS IN REAL TIME, which issued on Oct. 1, 2002 to Worster et al. The patent teaches call screening and other communications services that permit a subscriber to be provided with a caller-supplied spoken name when caller ID information is blocked or unavailable. The call screening service subscriber can decide after hearing the spoken identification information how to dispose of a call. A plurality of call disposition options are supported including accepting the call, rejecting the call, transferring to voice mail, etc. When a call seeking call disposition instructions is answered by an answering machine, the caller is connected to the answering machine without further call screening being performed. Thus, the use of home answering machines to receive messages from calls that would otherwise be blocked or disposed of is supported.

In the wireless domain, U.S. Pat. No. 6,246,889 to Boltz et al, entitled SYSTEM, METHOD, AND APPARATUS FOR DELAYED CALL ANSWERING,. teaches a method for enabling a cellular telephone user to answer a call, apply a delayed answering option, or ignore the call, in which case the call is sent to a voice mail box or is not answered. If delayed answering is selected, the call is switched within the mobile switching center (MSC) to an announcement machine, which announces that the called party will become available after a predefined period of time. If the called party requests connection with the calling party, the call is switched within the MSC to the called party. If within a predefined time limit the connection to the call is not requested, the call may be routed to voice mail, disconnected, or the called party may again be requested to hold the line.

U.S. Pat. No. 6,154,646 entitled SYSTEM AND METHOD FOR REAL-TIME INTERACTIVE SELECTION OF CALL TREATMENT IN A RADIO TELECOMMUNICATIONS NETWORK, which issued on Nov. 28, 2000 to Tran et al. describes a modified mobile station that includes a display, a browser application that presents call information regarding an incoming call and call treatment options in a pop-up menu on the display, a key pad for the user to select the call treatment option, and a Client Access Function Teleservice handler that packages selected call treatment options in an IS-136 R-DATA message and sends the R-DATA message to a modified mobile switching center. The mobile switching center sends the call-treatment option to a modified service node in a short message service message. A server in the service node receives the short message service message from the MSC, extracts the selected call-treatment option, and translates the call-treatment option into service scripts understood by the service node. The caller options may include accepting the call, or transferring the call to a selected call transfer number.

Although such call screening and inbound call treatment options are available to service subscribers, they provide a limited number of call handling options, and do not support many desirable features such as single number service, integrated voice mail box, and segregated voice mail box. Nor do they support efficient use of PSTN resources when a call is transferred to a directory number not supported by an MSC serving the called party.

Accordingly there exists a need for a method and system for inbound call control that permits a subscriber to dynamically screen inbound calls, and supports single number service integrated and segregated voice mail options.

SUMMARY OF THE INVENTION

It is therefore an object of the invention to provide a method and system for controlling an inbound telephone call to permit a subscriber to redirect any inbound call to any telephone number using any one of a plurality of data messaging interfaces.

It is another object of the invention to provide a location-independent service to a subscriber using respective available data messaging interfaces at the subscriber's locations to enhance inbound call control.

It is a further object of the invention to extend an enhanced service bundle that permits local number portability (LNP), or single number service (SNS) to include at least one of unified voice mail, segregated voice mail, and inbound call control.

In accordance with one aspect of the invention, a method is taught for providing an inbound call service to a public switched telephone network (PSTN) service subscriber. The method involves first receiving a call initiation message at a call service node (CSN) that does not complete the call in the PSTN. The CSN is a virtual node in the bearer network of the PSTN, but is a node in a common channel signaling network of the PSTN, so that it cannot complete calls to subscriber lines. Because the CSN is not associated with any particular subscriber line, the service subscriber can be associated with multiple telephone lines.

The method continues by extracting a called number from the call initiation message, and identifying the service subscriber associated with the called number. This may be performed by querying a subscriber database to obtain a subscriber record, for example; the subscriber record identifying one or more messaging network addresses, and a directory number of a call parking facility.

Once the service subscriber is identified, an inbound call notification message is issued over a messaging network to at least one messaging device operated by the service subscriber. The inbound call notification message provides information related to the inbound call and requests that the service subscriber selects a call treatment option for the inbound call. Because messaging networks typically provide messaging to a plurality of messaging network devices concurrently, the inbound call control can be effected by numerous devices and thereby provides a location-independent service.

The CSN routes the call to a call parking facility associated with the service. The parking facility may be an announcement player or a voice mail system. The parking facility used may be selected from one of a plurality of parking facilities associated with the service subscriber, and is preferably stored, for example in a schedule maintained by the service subscriber, the schedule associating the parking facility to be used as a function of time of day and day of week. The parking facility selected may further vary as a function of a calling party number identified in the call initiation message, whereby the segregated voice mail service may be provided.

A reply to the inbound call notification message is received from the service subscriber, the reply indicating the call treatment option selected by the service subscriber. In response, a call control application (CCA) that directs the CSN, effects the selected call treatment option, by controlling the call from the CSN in accordance with the call treatment option. For example the call may be terminated, monitoring of the call may be applied, the call may be transferred to a directory number associated with the service subscriber, or supplied by the service subscriber, or may be forwarded to another call parking facility.

If the reply is only received after the calling party terminates the call, the CCA can direct the CSN to automatically establish a call between the calling party and a directory number associated with the service subscriber or supplied by the service subscriber.

In accordance with another aspect of the invention, a system for interactive real-time inbound call screening is provided. The system includes a call service node (CSN) connected to a common channel signaling network of a public switched telephone network. The CSN is associated with selected trunk resources in a bearer network of the PSTN, but is not connected to the bearer network. The CSN is communicatively coupled to a call control application (CCA) that is adapted to direct the CSN. Specifically the CCA receives a content of common channel signaling messages received by the CSN from the CSN, and directs the CSN to selectively formulate and issue common channel signaling messages to PSTN switches that support the associated trunk resources.

The CCA is also adapted to request formulation and transmission of at least one inbound call notification message to a service subscriber upon receipt of a call initiation message addressed to a telephone number associated with the service subscriber. The inbound call notification message(s) provide the service subscriber with information about the inbound call, and request selection of a call treatment option for the inbound call from the service subscriber.

The system further includes at least one call parking facility to which the CSN can route inbound calls, pending a receipt by the CCA of instructions in a reply to one of the at least one messaging network message. The reply provides information about how the respective calls are to be treated.

In accordance with yet another aspect of the invention, a method for providing single number service to a public switched telephone network (PSTN) service subscriber is described. The method first involves receiving a call initiation message at a call service node (CSN) that does not complete the call in the PSTN. Next the service subscriber associated with a called number extracted from the call initiation message is identified.

The method further involves issuing an inbound call notification message over a messaging network to at least one messaging device operated by the service subscriber. The inbound call notification message provides information related to the inbound call, and requests that the service subscriber select one of a plurality of call treatment options. While waiting for a reply to the inbound call notification message, the CSN routes the call to a call parking facility associated with the single number service.

Upon receipt of the reply from the service subscriber indicating the selected call treatment option, the CSN controls the call in accordance with the selected call treatment.

BRIEF DESCRIPTION OF THE DRAWINGS

Further features and advantages of the present invention will become apparent from the following detailed description, taken in combination with the appended drawings, in which:

FIGS. 2a,b are two call flow diagrams illustrating principal steps involved in two alternative methods of directing a call over an enhanced ISUP trunk;

It should be noted that throughout the appended drawings, like features are identified by like reference numerals.

DETAILED DESCRIPTION OF THE PREFERRED EMBODIMENT

The present invention permits a public switched telephone network (PSTN) service subscriber to dynamically screen, control and route inbound calls to a directory number associated with, or specified by, the service subscriber. The service subscriber is notified of each inbound call via an inbound call notification message sent to a messaging network device operated by the service subscriber. The inbound call is routed to a call parking facility in the PSTN pending receipt of a call treatment option from the service subscriber. The call parking facility may be any call holding or call termination facility from which calls can be released from within the PSTN. For example, the call parking facility may be an intelligent peripheral that plays one or more prerecorded announcements to the calling party, or a voice mail server providing a voice mail box associated with the service subscriber. If a call treatment option is received from the service subscriber before the calling party hangs up, the call may be released from the call parking facility and reconnected to a telephone number specified by the service subscriber. If a call treatment option is received from the service subscriber after the calling party hangs up, a call is automatically established between the calling party and the service subscriber, assuming the call treatment option specifies a telephone number at which the service subscriber would like to receive the call and all privacy rules are applied. Advantageously, the inbound call notification message can be accessed at any of a plurality of messaging network devices operated by the service subscriber. The invention also provides a single number service that permits the subscriber to have incoming calls addressed to the single number transferred to predetermined directory numbers as a function of time of day, day of week or calling party number. The subscriber can also perform real-time, interactive inbound call screening to control call treatment for respective calls.

Figure 1:
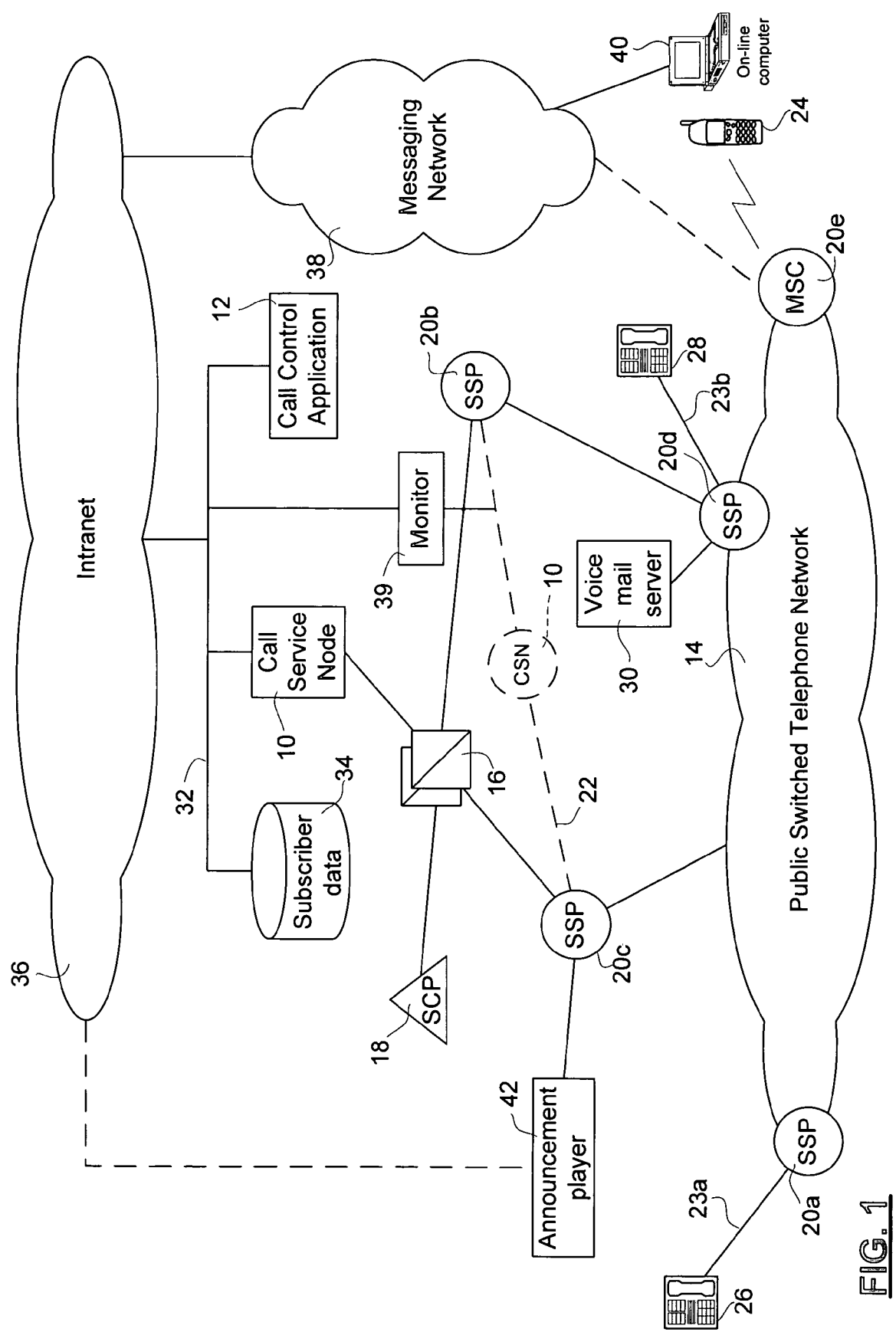
FIG. 1 schematically illustrates a deployment of a system in accordance with an embodiment of the invention.

FIG. 1 is a schematic diagram illustrating an embodiment of a system in accordance with the invention. A service in accordance with the invention is effected by a call service node (CSN) 10 and a call control application (CCA) 12 that are communicatively coupled to each other. The CSN 10 is a virtual node in the public switched telephone network (PSTN) 14, and a physical node in a common channel signaling network that is used to communicate call control information between nodes of the PSTN, as will be explained below in more detail.

The common channel signaling network interconnects signal transfer points (STPs) 16, service control points (SCPs) 18 and service switching points SSPs 20a,b,c,d,e. In North America, the common channel signaling network predominantly uses a Signaling System 7 protocol stack, although other signaling protocols such as "X.25" are also used. A common channel signaling network using SS7 protocol signaling is assumed for the purposes of illustrating the invention. Some SSPs 20 known in the art as mobile switching centers (MSCs), like MSC 20e, provide service to cellular telephones using selected radio frequency channels.

As is described in Applicant's U.S. Pat. No. 6,226,289, which is incorporated herein by reference, the CSN 10 is a node in the common channel signaling network having a point code. All common channel signaling messages related to calls routed over an Integrated Services Digital Network-User Part (ISUP) trunk 22 are received at the CSN 10 because the CSN 10 is a virtual node located between terminating ends of the ISUP trunk 22. The CSN 10 functions as a virtual node in the PSTN 14 in that it is adapted to formulate, send, forward, and respond to all of the common channel signaling messages associated with any ISUP trunk where it has been configured as a virtual node. However, unlike SSPs 20, the CSN 10 is not connected to any trunks in the bearer network, and does not support any service subscriber lines. When a call is routed over the ISUP trunk 22 (referred to hereinafter as an "enhanced" ISUP trunk), the associated common channel signaling messages are sent to the CSN 10 by one of the two SSPs 20b,c supporting the opposite ends of the enhanced ISUP trunk 22.

End office SSPs 20a,d serve a plurality of subscriber lines 23 (only two subscriber lines 23a,b are shown), permitting telephone service subscribers to receive and make telephone calls through the PSTN 14. The MSC 20e provides similar telephone service to cellular telephones such as cellular telephone 24 within a call using radio frequency channels in a manner well known in the art. While subscriber line 23a provides a telephone service subscriber using telephone 26 with plain old telephone service (POTS), some telephone service subscribers also subscribe to enhanced services.

The invention is illustrated by way of example with reference to a service subscriber associated with a telephone 28 connected to the PSTN 14 by subscriber line 23b, and the cellular telephone 24. The service subscriber's home telephone number is associated with a voice mail box supported by a voice mail server 30 that is a peripheral to SSP 20d that serves the subscriber line 23b. Other voice mail server configurations can equally be used, for example, the voice mail server may be connected by a leased line to a switch in the PSTN 14. The subscriber also subscribes to a messaging service. An instant messaging system, a pager service, or other message delivery system, including those currently in use, currently in development, and those that will be developed in the future, can be used as a messaging network in accordance with the present invention. The cellular telephone 24 may also be text message enabled, Worldwide Web browser enabled, or both, permitting the exchange of short message service (SMS) messages, Instant Messages and the like, to provide additional or alternative inbound call notification messages to the service subscriber. Messages may work in conjunction with more elaborate applications supported through Java applications in the Web environment or WAP applications provided by cellular phones. These are only examples of mechanisms for delivering interactive applications that could be used in conjunction with the service.

The CSN 10 and CCA 12 are interconnected by a local area network (LAN) 32 or the like so that upon receipt of a common channel signaling message, the CSN 10 can forward a content of the signaling message to the CCA 12, and receive instructions in reply. The CCA directs the CSN to selectively formulate and issue common channel signaling messages to PSTN switches that support a set of enhanced ISUP trunk resources for which the CSN is a virtual node. The CCA 12 further requests the transmission of at least one inbound call notification message to a service subscriber on receipt of a call initiation message addressed to a telephone number associated with the service subscriber. The inbound call notification message(s) provide information to the service subscriber about the inbound call and request selection of a call treatment option for the inbound call from the service subscriber.

A call treatment option received from the service subscriber in a reply to the inbound call notification messages may be interpreted with content of a subscriber database 34 also connected to the LAN 32. The CCA 12 also accesses the subscriber database 34 when the content of a call initiation message is received, using the original called party number to determine the service subscriber to which the call is directed, and optionally to identify a call parking facility for the inbound call.

The subscriber database 34 may include a subscriber and/or management-maintained schedule of 1) call parking facilities used for inbound calls pending receipt of a reply to an inbound call notification message; 2) messaging network address(es) to be used for formulating inbound call notification messages; (3) calling numbers used for voice mail segregation, as will be explained below in detail; and (4) default call treatment options that are applied to an inbound call if no reply is received from the subscriber within a predetermined time interval. Any of these schedules may be governed as a function of a time of day, day of week, and/or a called or calling party number.

The LAN 32 is typically connected to a service provider Intranet 36, which is, in turn, connected to a messaging network 38, such as an Intranet. Some messaging services support clients with world-wide web interfaces that permit message delivery from any web-enabled computer, such as on-line computer 40. It will be appreciated by those skilled in the art that the on-line computer 40 may be a personal digital assistant (PDA), Blackberry®-type device, wireless web browser, or a portable or tethered laptop or computer. Some cellular telephones also permit web browsing and may be equipped to receive Short Messages or Instant Messages, or have embedded applications as noted above.

Web enabled cellular telephones and many on-line computers 40 (i.e. messaging devices) are also able to receive and play streaming audio. Accordingly, a trunk monitor 39 that serves as a listening device connected to the enhanced ISUP trunk 22, can be activated by the CCA 12 to permit the service subscriber to screen the inbound call from any multi-media messaging device. Screening a call in this manner is non-intrusive so the calling party is not aware that monitoring is occurring. Specifically the CCA 12 can activate the trunk monitor 39, directing the trunk monitor 39 to begin converting the (generally pulse code modulated (PCM)) audio data transmitted over the enhanced ISUP trunk 22 into streaming audio format (or any other format that is required by the messaging device), and forwarding the streaming audio data to the messaging device. The trunk monitor 39 therefore permits the service subscriber to listen to the message being left for the service subscriber by the calling party.

The PSTN 14 is known to include systems for playing announcements, interactive voice response (IVR) units, call conferencing units, and other call parking facilities that are adapted to play prerecorded messages to a connected party. These parking facilities are also provided by intelligent peripherals of SSPs and independent service providers using leased lines, in a manner known in the art. In some cases the announcement player 42 may be adapted to receive messages to be played over the Intranet 36 in a prescribed format, or an identifier of an existing announcement to be played to a called party may be included in a message sent to the announcement player 42.

Having thus described the system of the invention, some exemplary call flows illustrating a few applications of the invention in terms of the principal messages exchanged to effect services in accordance with the invention, are described in FIGS. 2-4.

Figure 3A:
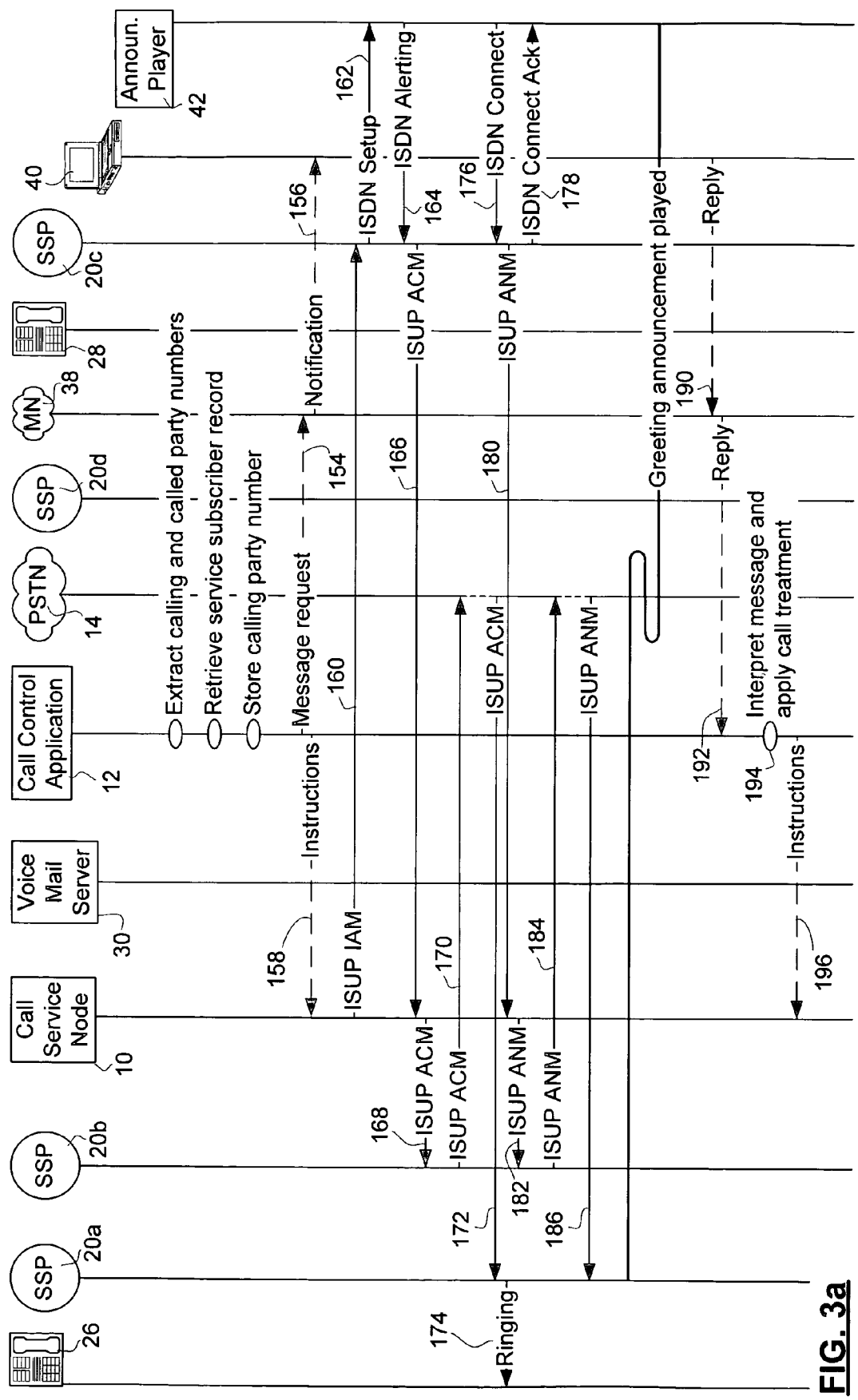
FIGS. 3a,b are two call flow diagrams illustrating principal steps involved in parking a call at an announcement player, and parking the call at a voice mail box, respectively.
Figure 4A:
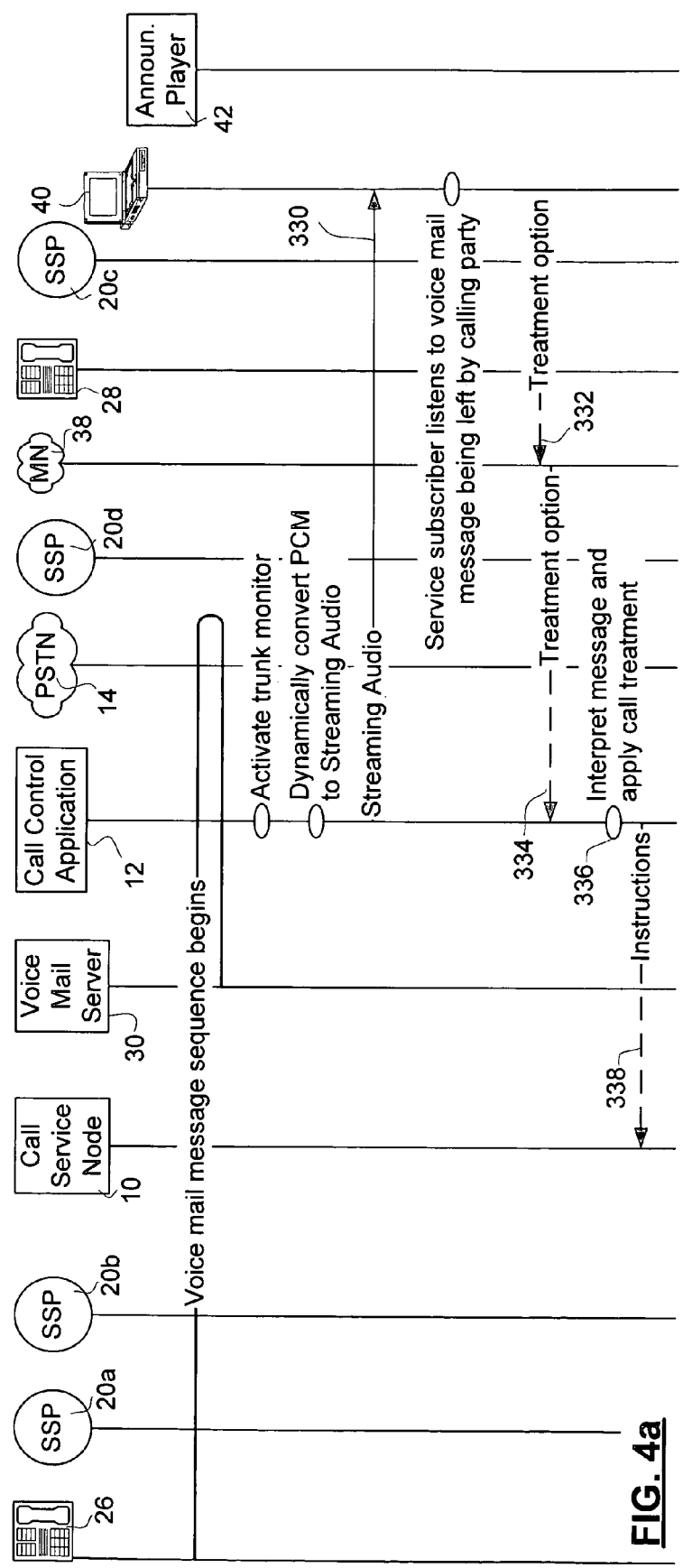
FIGS. 4a,b,c,d,e are five call flow diagrams illustrating principal steps involved in call treatment in response to respective call treatment options selected by a service subscriber.

FIGS. 2a,b show two alternative ways for directing an IAM to the CSN 10, as a precursor to providing the inbound call control service. FIGS. 3a,b show two alternative call parking options in which a call received at the CSN 10 is parked in one of two ways in accordance with a record associated with the subscriber. FIGS. 4a,b,c,d and e show how five different call treatment options are effected in accordance with the illustrated embodiment.

FIG. 2a is a call flow diagram schematically illustrating principal messages exchanged in order to establish a call connection passing through the CSN 10 in accordance with a first method.

A calling party, picks up the telephone 26 (step 100), hears a dial tone played by the SSP 20a (step 102), and then dials a directory number of the subscriber (step 104). The directory number may, for example, be a single number service number that is a "ported" number, well known in the art. The SSP 20a translates the dialed digits (step 106), and is prompted to issue a Transaction Capabilities Application Part (TCAP) query to the SCP 18 (step 108). The query may include all call details, but includes at least the called party number. The SCP 18 receives the TCAP query, and accesses a table that identifies a conversion number and a routing code that are associated with the dialed number. As will be understood by those skilled in the art, the routing code may be any one of a Switch and Trunk Identification Codes; Number Plan Area plus Number Plan Exchange Code (NPA-NNX); a Carrier Identification Code (CIC); or any other mechanism that will forward a call through the network to a specific ISUP trunk or ISUP trunk group. For the purpose of disclosure, the Carrier Identification Code (CIC) is used to illustrate the invention. It should be understood, however, that when the CIC is referred to, any suitable routing code is intended.

It will be appreciated by those skilled in the art that the translation of most directory numbers does not prompt a query to an SCP 18. Translation of a directory number usually identifies a next SSP 20 to which an integrated services digital network-user part (ISUP) Initial Address Message (IAM) is to be forwarded or a subscriber line at which the call is to be routed. However, in some cases, query-based processing is required. For example, locally ported directory numbers (in accordance with a local number portability (LNP) deployment), permit selected calls to be handled in this manner. An IAM is a call initiation message in accordance with the ISUP protocol.

Upon receipt of the response to the TCAP query in step 110, the SSP 20a translates the CIC identifier. A resulting point code of a neighboring switch of the PSTN 14 is returned. The SSP 20a therefore reserves a trunk extending to the neighboring switch, and, formulates an IAM. The IAM is sent over the common channel signaling network of the PSTN 14, to the neighboring switch (step 112). The neighboring switch reserves the opposite end of the reserved trunk identified in the IAM, and, in a like manner, processes the IAM, forwarding it to a next switch in the PSTN 14. The connection is reserved hop-by-hop through the PSTN 14, until an IAM reaches the SSP 20b (step 114) associated with the identified carrier. In accordance with the illustrated embodiment, the SSP 20b is not an inter-exchange carrier (i.e. a long distance service provider), but rather provides access to the enhanced ISUP trunk 22. The SSP 20b reserves trunk resources of enhanced ISUP trunk 22, and forwards the IAM to the CSN 10 (step 116). In step 118 content of the IAM is extracted from the IAM, and sent to the CCA 12.

It should be noted that the method shown in FIG. 2a generally occupies fewer PSTN 14 resources and can be used to efficiently provide a single number service. The advantage of a second method (illustrated in FIG. 2b) is that potentially any telephone service subscriber that has call forwarding enabled on a subscriber line, can subscribe to the inbound call control service in accordance with the invention, and a ported number assignment is not required.

The second method for directing a call over the enhanced ISUP trunk 22 is shown in FIG. 2b. As described above, the calling party places a call by taking the telephone 26 off-hook (step 120), listening for the dial tone (step 122), and dialing the directory number of the subscriber (step 124). Upon receipt of the dialed number, the SSP 20a translates the dialed digits, identifies a point code of a neighboring switch, reserves a trunk to the neighboring switch, and issues (step 126) an IAM to the neighboring switch over the common channel signaling network.

The resources for the call are reserved in a hop-by-hop manner until an IAM is forwarded to SSP 20d (step 128), which serves the service subscriber. The subscriber line 23b is identified as a subscriber line for which a call forward service feature is enabled. The call forward service may be activated conditionally or universally. If the call forward service is universal, any call addressed to the subscriber line is transferred to an associated telephone number. Otherwise the call is only transferred if the subscriber line is busy, or if there is no answer after a predetermined number of rings (no answer). The processing of the SSP 20*d* is slightly different in these different cases. If the call forwarding is universal, the IAM is formulated without a customary probe of the subscriber line 23*b* to determine whether the subscriber line 23*b* is off-hook. It will be appreciated by those skilled in the art that if conditional call forwarding is active, and the line is not busy, the SSP 20*d* returns an ISUP Address Complete Message (ACM), which is returned hop-by-hop through the PSTN 14 to the SSP 20*a*, and applies a ringing to the subscriber line. In this case the SSP 20*d* effects the redirection in accordance with a slightly different message flow, in a manner well known in the art.

Having determined that the call is to be forwarded to a specified CIC (for example), the SSP 20*d* translates the CIC, and determines a next switch in the PSTN 14 to carry the call, reserves trunk resources, and forwards an IAM (with the CIC) to the next switch (step 130). In turn, the next switch translates the CIC and forwards the IAM to a next hop, which may be again repeated until the IAM is received at the SSP 20*b* (step 132). It will be noted that the SSP 20*b* serves much the same function as the SCP 18 in the method of FIG. 2*a*. SSP 20*b* reserves the resources in enhanced ISUP trunk 22 for the call, and forwards the IAM to CSN 10, in step 134. The content of the IAM is likewise sent to the CCA 12 in step 136.

FIG. 3*a* shows a call parking scenario whereby the call is parked at the announcement player 42 once an IAM is received at the CSN 10 from SSP 20*b*. At the beginning of the call parking scenario, the IAM has been received at SSP 20*b*, and a chain of trunk resources between the SSP 20*a* and SSP 20*b* are reserved for the call, and the content of the IAM is sent from the CSN 10 to the CCA 12, via the LAN 32 as described above with reference to one of FIGS. 2*a,b*.

The content includes directory numbers in a called party number field, calling party number field, original called party number field and a redirecting number field (if available), and any other relevant information available in the call initiation message. The calling party number field of the received IAM has not been used for routing purposes but was inserted by the SSP 20*a* and was copied into the calling party number field as the call is routed through the network. The original called party number field contains a directory number of the called party and can be used to identify the service subscriber. For example, once the called party number or the original called party number, if both are available, is extracted from the call initiation message it is used to query the subscriber database 34 to retrieve a service subscriber profile that stores default information about how calls to the service subscriber are to be handled.

In accordance with the present embodiment, the CCA 12 is responsible for directing the CSN 10 to insert a telephone number associated with the announcement player 42 into the called number field of the IAM. In the illustrated example, the CCA 12 ascertains that the call is associated with the service subscriber using the original called party number, and retrieves a record associated with the service subscriber (e.g. stored in the subscriber database 34). The subscriber's record may be accessed to determine a call parking facility to be used for calls received by the subscriber. The call parking facility selected may also depend on the calling party's directory number, the time of day, and/or day of week. This allows for customized announcements to be played. It should be noted that generic announcements can also be used depending on the service attributes.

In either case the CCA 12 effects the parking of the call, stores the calling party's directory number, and requests or effects transmission of a messaging network message over an Intranet connection to a world-wide web interface of the messaging network (step 154). The directory number of the calling party is stored to enable the CCA 12 to establish a call to the calling party, if the calling party hangs up but the subscriber elects to accept the call. It can also be used to provide a call history of incoming calls. The messaging network 38 delivers an inbound call notification message to the subscriber's on-line computer 40 (step 156). The inbound call notification message may be transmitted in accordance with any one of a number of frequently used messaging protocols, such as: a Short Message Service protocol, a Wireless Application Protocol, an Instant Messaging protocol, and a Partial Collision Detection protocol. The inbound call notification message includes information associated with the call. Such information may simply be that an inbound call has been received, but it may further include such information as: a calling line identification (CLID), a directory number of the calling party, or any information associated with the calling party in the subscriber database 34, for example, "Mom is calling". A calling name database can also be queried to provide the name of the incoming caller.

If the messaging network is similar to known Instant Messaging networks, the notification will be made available to the subscriber at any of a number of interfaces and devices, so that if the service subscriber desires, inbound call notification can be sent to a number of messaging devices simultaneously. In accordance with alternative embodiments, short message service (SMS) or other short text messaging services commonly provided to cellular telephone users, may additionally or alternatively be used. The CCA 12 is preferably adapted to request that notifications be sent on all of the messaging networks that the subscriber is registered to use, or any subset of these specified by the subscriber record. The subscriber may, for example, provide a schedule of messaging network addresses to be used as a function of time of day, day of week, etc. such as maintained via an enhanced service provider's world-wide web interface. Such a schedule may be stored in the subscriber database 34, for example, and may be accessed by the CCA 12, in a manner well known in the art.

Once the messaging network message(s) is sent in step 154, The CCA 12 directs the CSN 10 to advance the IAM to the SSP 20*c* in a message sent in step 158. The IAM routes the call to the announcement player 42, and may include the original called party number, or another number associated with the subscriber that is useful for selecting an announcement to be played to the calling party. Accordingly, the CSN 10 forwards the IAM addressed to the announcement player 42, to SSP 20*c* (step 160), which happens to be connected to the announcement player 42. The SSP 20*c* receives the IAM, translates the number in the called party number field, and identifies the address as local. Accordingly the SSP 20*c* completes the call by issuing an ISDN set-up message to the announcement player 42 (step 162). In a manner well known in the art, a call proceeding message is returned to acknowledge the request, and once a selected resource of the announcement player 42 is determined to be available, an alerting ISDN message is returned to the SSP 20*c* (step 164). Upon receipt of the alerting message, SSP 20*c* returns through the call connection, an ACM that indicates to a previous switch in the chain of reserved resources (SSP 20*b*) to the fact that the reserved resources are to be committed. The ACM is automatically returned to the previous switch in the reserved chain of trunk resources, hop-by-hop arriving at the CSN 10 in step 166, the SSP 20*b* in step 168 and then at each of the other switches in the chain (step 170) until the ACM is received at the SSP 20*a*, which serves the calling party (step 172). The SSP 20*a* then cuts through the subscriber line with to reserved local trunk resources and a bearer channel between the announcement player 42 and the calling party is active. Ringing that is effected by the SSP 20c can then be heard by the calling party (step 174).

Meanwhile, the announcement player 42 has effectively answered the call, and an ISDN connect message is issued to the SSP 20c (step 176), which is acknowledged (step 178). The SSP 20c therefore initiates a cascade of ISUP answer messages (ANMs) that flow through the chain of switches in a manner similar to the ACMs. The ANM sent to the CSN 10 (step 180), is returned to the SSP 20b (step 182), and through the PSTN 14 (step 184) to the other SSPs 20 in the chain, until the ANM is received at SSP 20a (step 186). The call is now in service and the communications session begins. In particular, a greeting announcement (i.e. a prerecorded message) may be played. The greeting may be personalized by the subscriber according to the calling line identifier (CLID) included in the call (if available) or may be specified in correlated messages sent over the Intranet 36 by the CCA 12 when the messaging network message is sent, for example. In some embodiments the announcement player 42 simply plays the same message to all calling parties; the message requesting that the calling party wait while the called party is located.

It will be appreciated that it may take less time for the call to be completed and the announcement player 42 to complete the message, than it takes for the subscriber to receive the inbound call notification message, select a call treatment option, and reply to the CCA 12. Accordingly the announcement player 42 may be designed to deliver content likely to be of interest to the calling party, such as recorded music, etc. Preferably, the CCA 10 applies a default call treatment option specified in the service subscriber profile if the reply is not received before a predetermined time lapses. The predetermined call treatment may be transferring the inbound call to a subscriber voice mail box, for example.

In step 190 the subscriber replies to the inbound call notification message, identifying a selected call treatment option. The selected call treatment option specifies a directory number at which the inbound call is to be received, or an indication that the call should be dropped. The reply is forwarded to the CCA 12 over the Intranet 36 (step 192), where it is interpreted to determine the selected call treatment option. The call treatment option may involve forwarding the call to a voice mail box, transferring the call to one of the subscriber's telephones, transferring the call to any other specified directory number, or releasing the call. If the call treatment option requests that the call be forwarded to a voice mail box, the call treatment option may also specify that the active voice mail box session is to be monitored by the subscriber. It will be understood that the subscriber may not be available to reply to the inbound call notification message, and so after a predetermined time lapses, the call may be treated according to a default call treatment option; for example, forwarding the call to voice mail, or transferring to a default directory number. The default call treatment option may be maintained in a schedule associated with the subscriber, and as such may depend on a time of day, day of week, calling party number, etc.

While typically the call treatment option will be received at the CCA 12 only after the announcement player 42 has played the announcement, it will be appreciated that this is not necessarily the case, and the announcement player 42 may therefore be interrupted. To prevent unwanted interruption, the CCA 12 may be programmed to interrupt only after a predetermined of time has elapsed after the ANM is received at the CSN 10, for example.

Figure 3B:
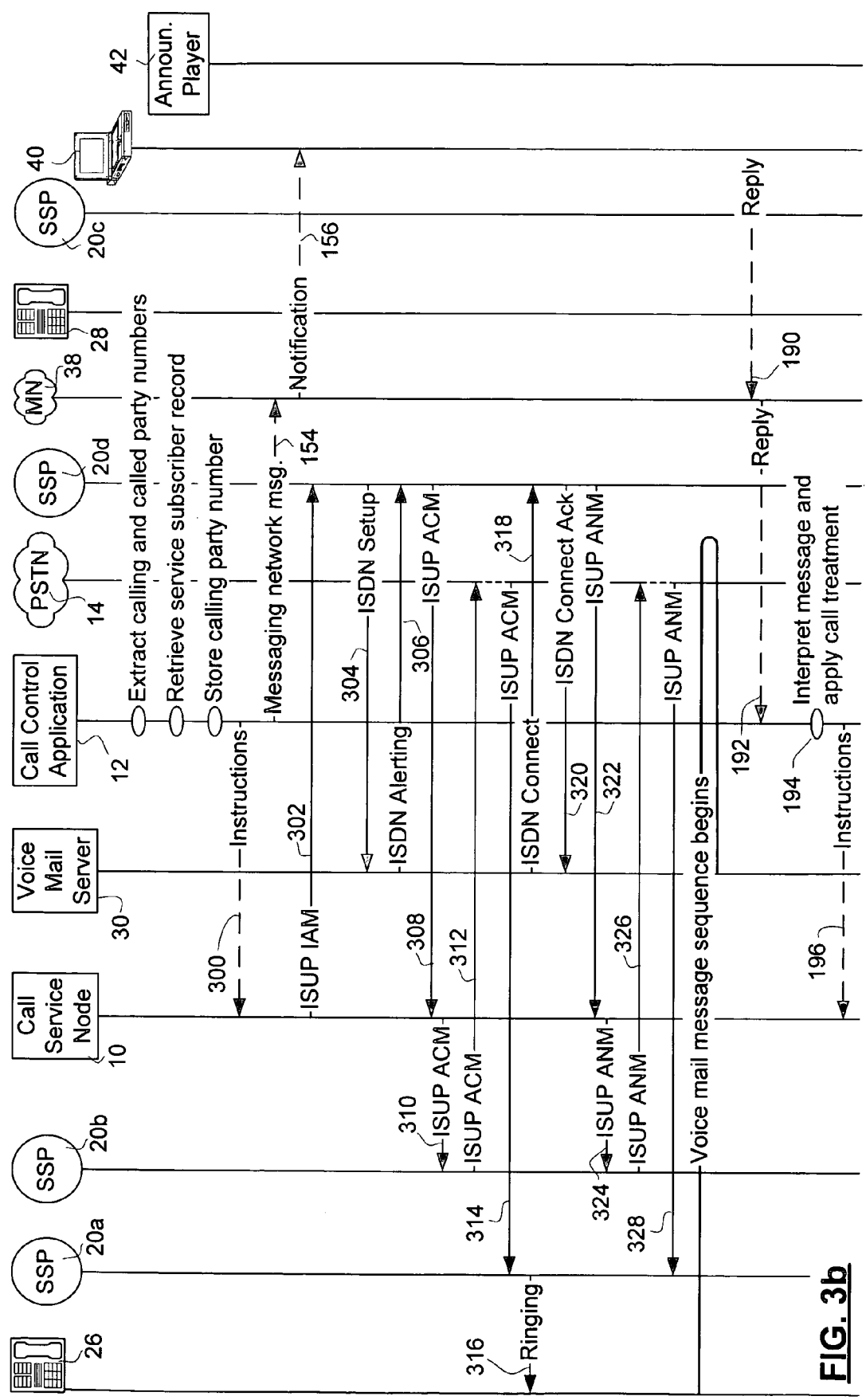

FIG. 3b schematically illustrates principal messages exchanged in accordance with an embodiment of the invention in which the call is routed directly to a voice mail box of the subscriber. Routing the call to the voice mail box generally involves modifying the call initiation message by inserting an address of the voice mail box into the called number field of the call initiation message, and inserting a subscriber telephone number associated with the voice mail box in a redirecting number field of the call initiation message. Normally, the subscriber number associated with the voice mail box is the telephone number in the called number field. However, if the subscriber subscribes to a unified voice mail service, the telephone number associated with the voice mail box may not be the called number. In that case, the subscriber telephone number associated with the voice mail box is different from the client telephone number in the called party number field of the call initiation message. Consequently, the telephone number in the called number field is moved to the original called number field and the telephone number associated with the voice mail box is inserted in the redirecting number field, as described above.

The call is forwarded to the CSN 10 as before (steps 116, 134 of FIGS. 2a,b), and then the CSN 10 sends the content to the CCA 12, as previously described (steps 118, 136 of FIGS. 2a,b). Preferably the procedure for identifying the call parking facility involves: extracting the number from the IAM; using the original called party number in a query to retrieve a service subscriber profile; extracting a calling party number from the IAM; searching the service subscriber profile to determine whether the calling party number is associated with a specific call parking facility to which the call is to be forwarded; and if the calling party number is associated with a specific call parking facility, directing the CSN 10 to park the inbound call at the specified call parking facility, otherwise routing the call to one of an announcement player or a default voice mail box specified in the service subscriber profile.

The CCA 12 stores the calling party number, and determines that the inbound call control service applies to the call, and consequently, it requests or effects transmission of the inbound call notification message in steps 154, 156 as described above. The only difference between the embodiment shown in FIG. 3a and that shown in FIG. 3b, is that it is determined that the call is to be routed to the voice mail server 30, instead of the announcement player 42.

The CCA 12 controls the formulation of the IAM, selecting the called party number for the call, and inserting in a called party number field of the IAM whatever address may be required to ensure that the correct voice mail box is selected by for the voice mail server 30. In this manner a unified voice mail service is provided, permitting calls addressed to different numbers to be sent to a single voice mail server. A redirecting reason field in the IAM can also be set. The CCA's 12 reformulation of the IAM may be particularly important if the subscriber has call forwarding activated at multiple subscriber lines/cellular telephones. In that case the criteria for directing the call to the correct voice mail box is the original called party number or the redirecting number. Accordingly, the ability to control to which of a plurality of voice mail boxes, announcers, etc. the call is parked using the called party number or the redirecting number, if available, and the calling party number (optionally along with time of day and day of week) to provide a service referred to herein as segregated voice mail, is advantageously permitted using the CCA 12.

After the voice mail box is selected, the CCA 12 directs the CSN 10 (step 300) to forward the IAM toward the directory number of the voice mail server 30 (step 302). Steps 302-328 are similar to steps 160-186 described above with reference to FIG. 3a in that the IAM is forwarded hop-by-hop by translation of the called party number at each switch (SSP 20c, SSP 20d) to the switch serving the called party number (the voice mail server 30), and the ACMs are cascaded back to the SSP 20a through the switches along the chain of reserved trunking facilities. When the call is answered at the voice mail server 30 an ISDN connect message is issued and acknowledged, as before, prompting an analogous cascade of ANMs that progress toward the SSP 20a, alerting the switches that live communications are to begin.

The voice mail server plays a prerecorded greeting associated with the subscriber's mail box. The subscriber may indicate in the prerecorded greeting that the voice mail session may be interrupted, so that the calling party is not alarmed if this happens.

The steps 190-194 are also repeated in accordance with the second embodiment, although it should be appreciated that these steps may only be effected after the voice mail session ends because the calling party hangs up as is described below with reference to FIG. 4d.

FIG. 4a shows call treatment for a call that is routed to the voice mail server 30, when the subscriber selects a monitor active voice mail session call treatment option. When the reply to the inbound call notification message is received in step 190, the CCA 12 activates the trunk monitor 39. The trunk monitor 39 begins converting monitored content into a format compatible with the on-line computer 40 from which the reply was received. More specifically, the trunk monitor 39 samples the bearer channel, and dynamically converts the samples from pulse code modulated (PCM) audio data into streaming audio data. In step 330 the streaming audio data is sent from the trunk monitor 39 to the on-line computer 40.

If the subscriber's reply to the inbound call notification message indicated that monitor active voice mail session call treatment option was selected, the audio is played to the service subscriber at the on-line computer, to permit the service subscriber to listen to the voice mail message in real time. Accordingly, after the subscriber decides how to handle the call given the message being left by the calling party, the subscriber selects a call treatment option, which is sent via the messaging network 38 (step 332) to the CCA 12 (step 334). The CCA 12 interprets the message and applies the call treatment (step 336), by sending instructions to the CSN 10, in step 338.

The trunk monitor 39 can be used in substantially the same way to monitor a voice mail session from the beginning. For example if the call was initially parked at an announcement player 42 the service subscriber may select a route to voice mail box with monitoring call treatment option, which results in the call being forwarded to the voice mail box, and as soon as the voice mail session is active, activating the trunk monitor 39 as described above.

FIG. 4b shows principal messages involved in effecting the subscriber's call treatment option as in step 194, when a receive call at home call treatment option is selected, whereby the call is transferred to the subscriber's telephone 28. It will be appreciated by those skilled in the art, that a reconnect message may be played by the announcement player 42 prior to the reconnection, so that the calling party is not confused by the momentary silence and is prepared for reconnection (for example, as shown in FIG. 4e).

In a step 196 immediately prior to the message flow shown in FIG. 4b, the CCA 12 directs the CSN 10 to release the call leg that extends to the announcement player 42, and to establish a call connection to the subscriber's telephone 28. The CSN 10 effects the release of the leg of the call by issuing an ISUP Release (REL) message to SSP 20c, in step 352. In accordance with standard call processing, a switch, on receipt of a REL message releases the trunk resources, acknowledges the REL message, and forwards the REL message to the next switch associated with the call. Accordingly the Release Complete (RLC) acknowledgement is returned by SSP 20c (step 354), and the SSP 20c issues an ISDN release message to the announcement player 42 (step 356).

Once the RLC acknowledgement is received at the CSN 10, the CSN 10 can initiate the reconnection. An IAM formulated and issued to SSP 20c (step 358) preferably contains the directory number dialed by the calling party in the redirecting number field, but contains the directory number of the subscriber telephone 28 in the called party number field. The called party number is translated by the SSP 20c, to identify the next switch to serve the call. The SSP 20c therefore reserves trunk resources for the call, and forwards the IAM, in step 360, to the identified next switch (i.e. SSP 20d), which happens to serve the subscriber line 23b. Upon receipt of the IAM, the SSP 20d recognizes the called party number as local, and probes the subscriber line 23b to determine whether the telephone 28 is on-hook, or off-hook. Finding that the telephone 28 is on-hook, the SSP 20d completes the call, cutting through the subscriber line 23b to the trunk resources reserved for the call, applying ringing to the subscriber line 23b (step 362), and issuing an ACM to the SSP 20c (step 364). SSP 20c cuts through the trunk resources, and forwards the ACM to the CSN 10 (step 366). When the SSP 20c cuts through the connection, a bearer channel connects the calling party with the subscriber line, and the calling party hears the ringing. The CSN 10 breaches standard call processing by discarding the ACM without relaying it back to a previous switch. This is necessary because the previous switches are all in a call active state and an ACM would not be expected. Similarly, once the subscriber answers the telephone, and the off-hook state is detected by the SSP 20d, ACMs are forwarded to the SSP 20c (step 370), and from there to the CSN 10, where the ANM is also discarded. The call is now complete.

FIG. 4c shows how a call treatment is applied when the call initially routed to the voice mail server 30 is transferred to a cellular telephone 24. Upon receipt of the call treatment option that specifies the cellular telephone 24, the CCA 12 directs the CSN 10 to disconnect and reconnect (prior step 196). The CSN 10 releases the call leg by issuing a REL message sent in step 380 which is forwarded to the SSP 20c. After the release of the trunk resources, the release is acknowledged (step 382) with a RLC message, and the SSP 20c sends an ISDN release message to the voice mail server 30.

Messaging steps 386-399 are directly analogous to steps 358-372 shown in FIG. 4b, as the call is recompleted to the cellular telephone 24 in a hop-by-hop manner. Therefore descriptions of these steps are not repeated here.

Figure 4D:
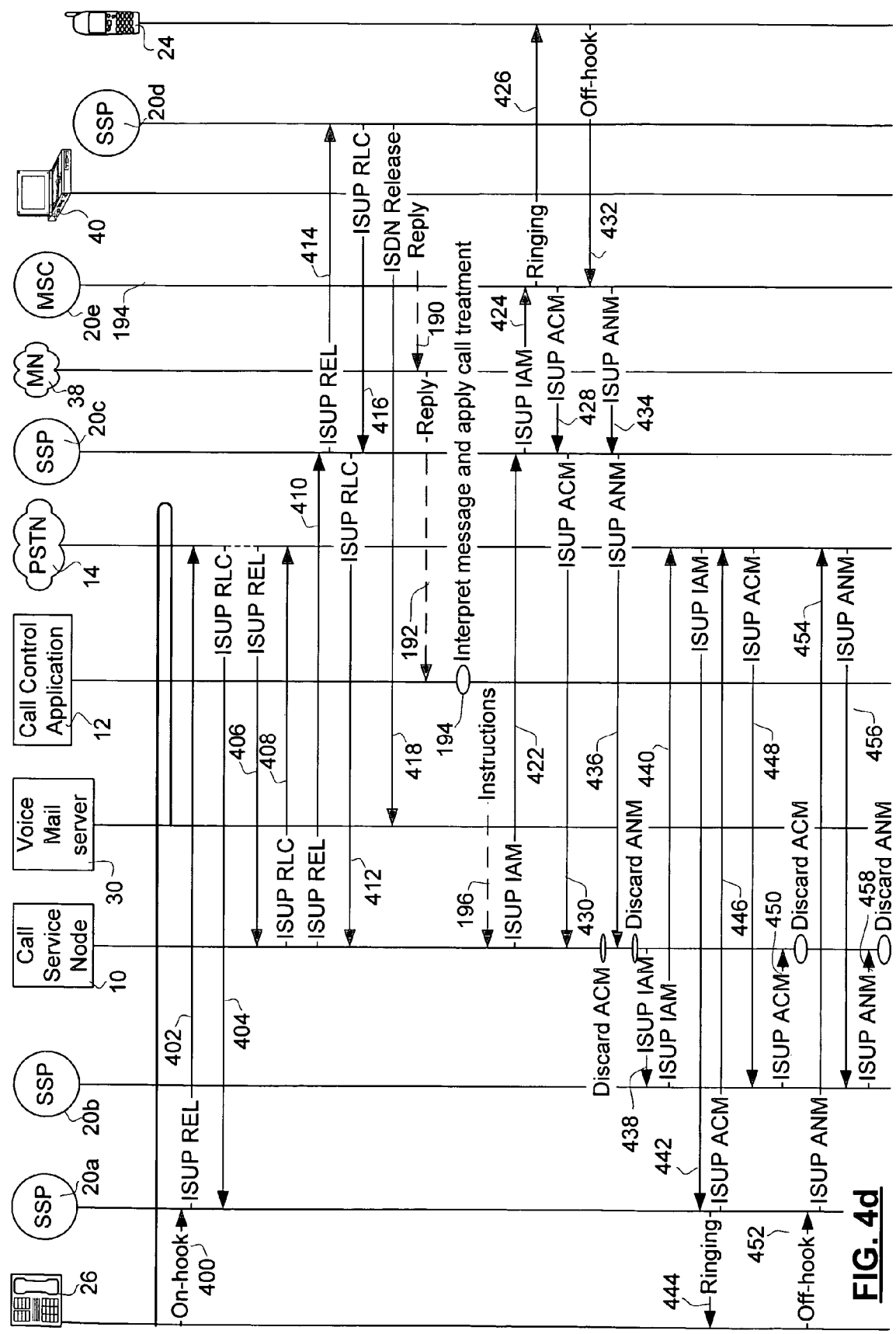
Figure 4E:
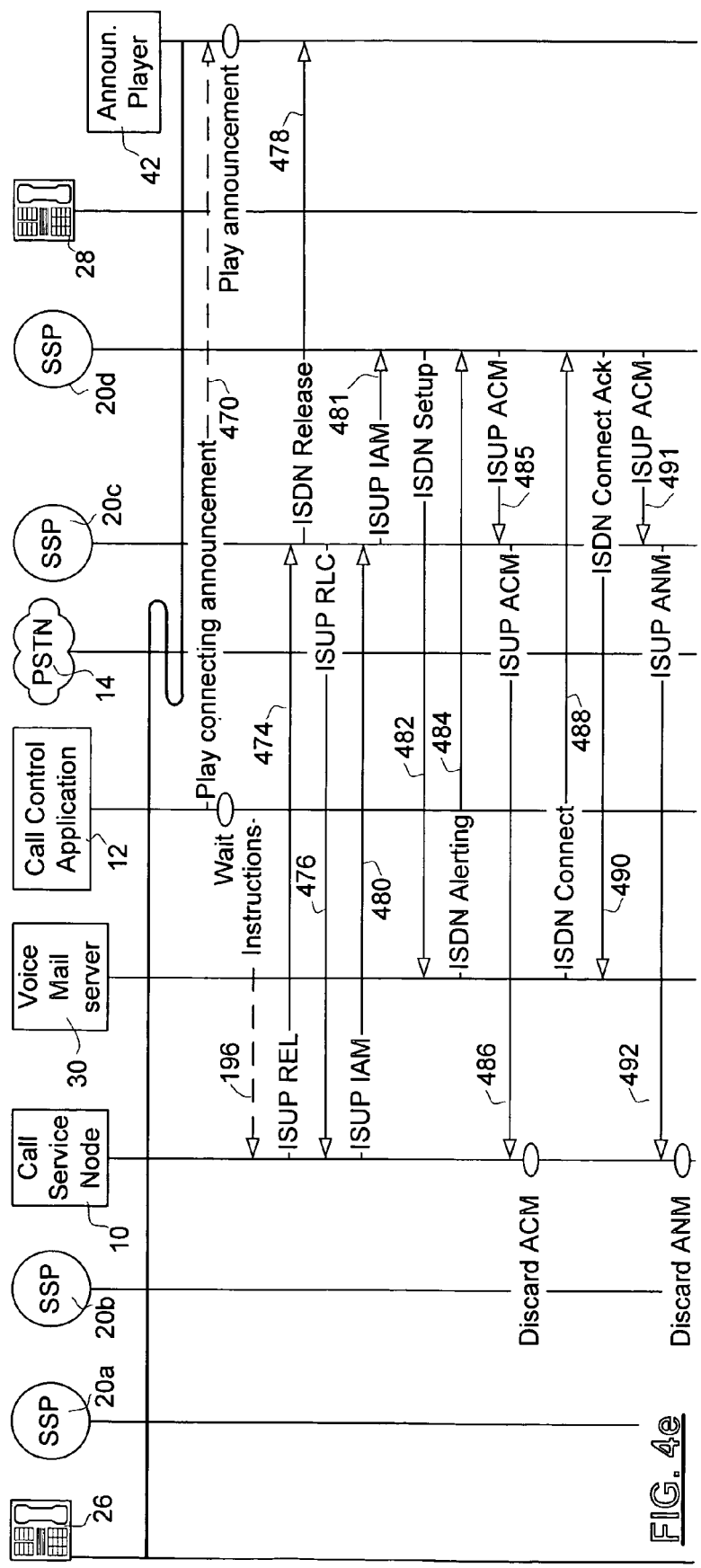

FIG. 4d shows how a call treatment option is effected if the calling party hangs up before the call treatment option is received at the CCA 12, and the call treatment option is a request to receive the call at a specified telephone. The release of the call by the calling party is effected in steps 400-414. Specifically the calling party's telephone 26 goes on-hook, and this is detected by the SSP 20a (step 400). The SSP 20a then releases the trunk resources occupied by the call, and issues a REL message to the previous switch in the PSTN 14 (step 402). The RLC acknowledgement is returned in step 404. The REL message is forwarded hop-by-hop through the PSTN 14, with RLC acknowledgements returned at every hop, until the REL message is received at the CSN 10 (step 406), and, the RLC acknowledgement is returned by the CSN 10 in step 408. The CSN 10 is directed by the CCA 12 to forward the REL to SSP 20c (step 410), the RLC being returned in step 412. Subsequently the SSP 20c does the same (steps 414, 416). On receiving the REL message, SSP 20d recognizes the called party number as local, and issues an ISDN release message to release the associated resources (step 418).

The call is now released, however the calling party number was saved by the CCA 12, to permit an automatic reconnection, as described below. It is assumed that a reply from the subscriber is received by the CCA 12 only after the call is released (steps 190, 192). The CCA 12 inspects the reply, and determines that the call is to be completed to the subscriber's cellular telephone 24. Accordingly, the CCA 12 chooses available enhanced ISUP trunk resources for the call, and directs the CSN 10 to issue an IAM to the SSP 20c.

A bearer channel between the CSN 10 and the cellular telephone 24 is reserved in, the hop-by-hop procedure. In step 422, the IAM is sent to SSP 20c, which reserves the chosen trunk resources, translates the directory number of the cellular telephone 24, and forwards the IAM to the MSC 20e (step 424), via the PSTN 14 in a known manner. The MSC 20e completes the call, establishing a connection with the cellular telephone 24, effecting ringing (step 426), and returning an ACM (step 428) to the previous switch in the chain of reserved resources extending between the SSP 20a, and the MSC 20e. The ACM is forwarded to the CSN 10 in step 430, and is discarded. When the subscriber answers the telephone, a signal is sent to the MSC 20e indicating that the cellular telephone 24 is off-hook (step 432). Subsequently MSC 20e issues an ANM (step 434) that is relayed to SSP 20c, and from there to the CSN 10 (step 436). The CSN 10 discards the ACM and ANM messages it receives, as before because SSP 20b does not have any associated trunk resources reserved for the call (no IAM has yet been issued).

As will be appreciated by those skilled in the art, in alternative embodiments, the two bearer channels may be initiated at substantially the same time, the second bearer channel can be initiated as soon as the ACM is received from the first, or, as shown in the illustrated embodiment, the CSN 10 can be directed to establish the second bearer channel in response to the ANM. The advantage of the illustrated embodiment is that it prevents the calling party from being called if the subscriber does not answer.

At the same time, it will be recognized that the longer the enhanced ISUP trunk resources are reserved by SSP 20c before the same resources are allocated by SSP 20b for the same call, the greater the probability that "glare" occurs. Glare occurs when two ends of the same trunks are reserved for different calls. Accordingly, in alternative embodiments, the two IAMs are forwarded at substantially at the same time. Other mechanisms known in the art may be used to reduce occurrence of glare or resolve glare when it occurs.

The second IAM is sent to the SSP 20b (step 438) the IAM being addressed to the directory number stored upon receipt of the first IAM in step 150 (FIGS. 3a,b). The second IAM is forwarded hop-by-hop through the PSTN 14 (step 440), until it is received at SSP 20a (step 442), which determines that the called party number is local, and applies ringing to the on-hook subscriber line (step 444). The SSP 20a returns an ACM, which cascades back through the PSTN 14 (step 446) to the SSP 20b (step 448), and finally is received at CSN 10 (step 450), where the ACM is discarded. The subscriber can now hear the calling party's telephone 26 ringing. When, in step 452, the SSP 20a detects the calling party answering the telephone 26, ANM messages are cascaded back through the PSTN 14 (step 454), to SSP 20b (step 456), and finally to CSN 10 (step 458), where the ANM is also discarded. The call is now active.

It will be appreciated by those skilled in the art that parking the call at the voice mail server 30 is advantageous because the call does not have to be redirected if the subscriber sets the voice mail box as the default treatment for the call. However, the voice mail server does not extend a time for the subscriber to respond to the inbound call notification message. Furthermore it may be that many calling parties will hang up as soon as a voice mail session is initiated. If the calling party wishes to be able to direct the inbound call, it may be preferable to park the call first to the announcement player 42, and then to forward the call to the voice mail server 30 after a predetermined delay, as shown in FIG. 4e.

It should be noted that the steps of FIG. 4e may be applied upon receipt of a call treatment option requesting that the calling party be sent to voice mail, or in response to lapse of a timer that is associated with the call, the timer having been started when the ACM was received from the announcement player 42 in step 166 of FIG. 3a. It should further be noted that if the call treatment option is received after the voice mail session has begun, the call can be transferred again to a subscriber-specified number, a different voice mail box, etc. using messaging similar to that shown in FIG. 4c. If the subscriber directs the call to a voice mail box with monitoring, the subscriber will again have the option of receiving the call at any selected telephone number.

FIG. 4e shows principal steps involved in reconnecting the call parked at the announcement player 42, to the voice mail server 30. In step 470, the CCA 12 issues a request message to the announcement player 42 requesting that the announcement player 42 play a prerecorded reconnecting message to the calling party. The reconnecting message may be supplied to the announcement player 42 in the request message, or an identifier of the reconnecting message can be sent in the request message, along with an identifier of the call. For example, the reconnecting message may be a request for the calling party to wait while the call is transferred, and may indicate that the called party is not currently available.

The prerecorded reconnecting message is played at the announcement player 42, and the CCA 12 waits a predetermined period of time before directing the CSN 10 to release the leg of the call between the CSN 10 and the announcement player 42, so that the reconnecting message is not interrupted.

In step 472, the CCA 12 directs the CSN 10 to release and reconnect the call. The CSN 10 therefore issues a REL message to the SSP 20c (step 474), prompting the SSP 20c to free the associated trunk resources, return a RLC acknowledgement (step 476), and issue an ISDN release message to the announcement player 42. On receipt of the RLC, the CCN 10 under direction of the CCA 12, sends an IAM addressed to the voice mail server, containing the requisite redirecting number to permit access to the corresponding voice mail box as described above. The IAM is sent to SSP 20c (step 480), which forwards the IAM (step 481) to SSP 20d, which serves the voice mail server 30. The SSP 20d sends an ISDN setup message to the voice mail server 30 (step 482), and receives the alerting message, in reply (step 484). An ACM is consequently returned to the SSP 20c (step 485), and then to the CSN 10 (step 486), where it is then discarded. Similarly when the voice mail server 30 answers the call, a connect message is sent to the SSP 20d (488), the connect message is acknowledged (step 490), and an ANM is forwarded to the SSP 20c (step 491), and from there to the CSN 10 (step 492), completing the call reconnection.

Figure 5A:
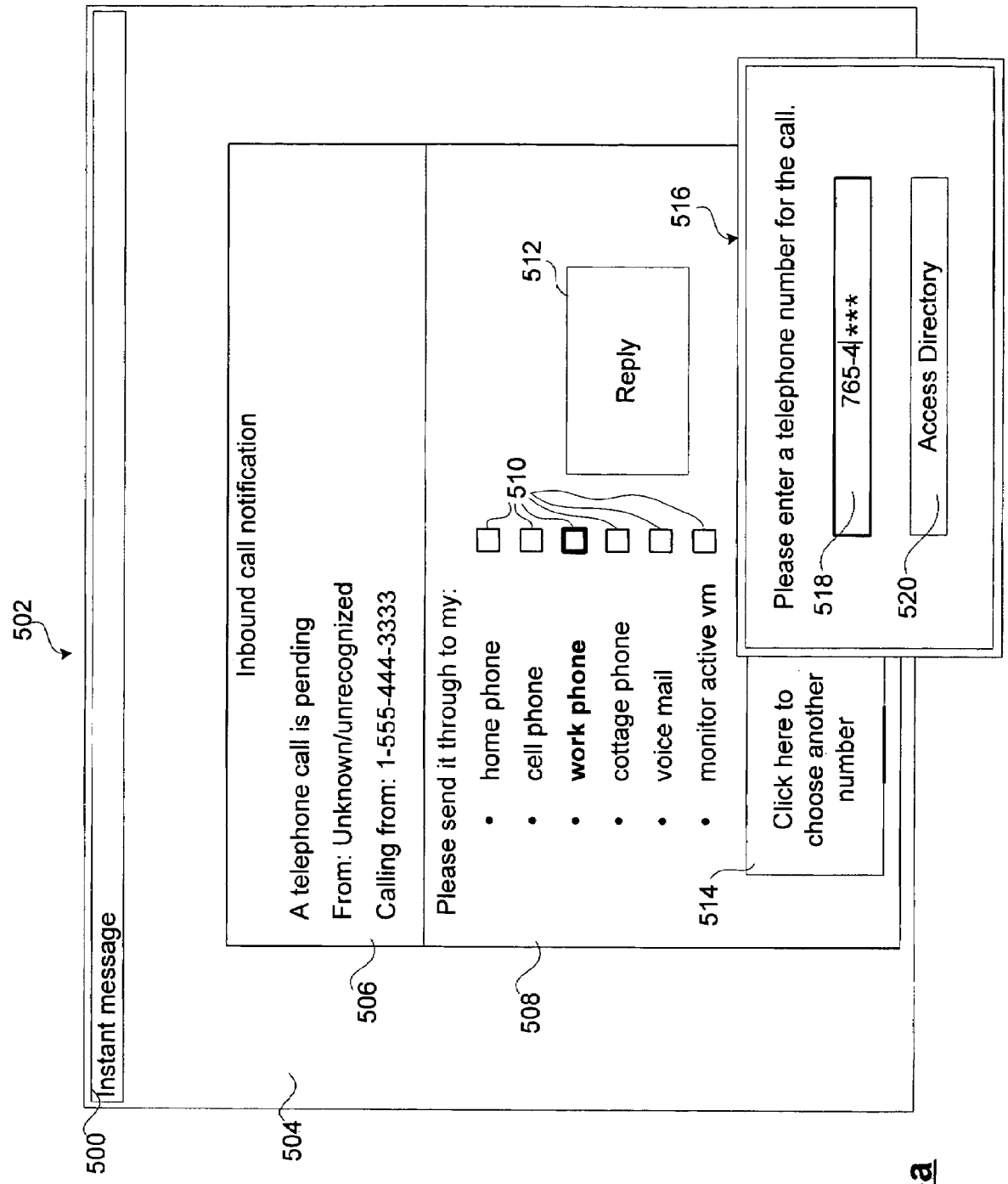
FIGS. 5a,b are two schematic illustrations of inbound call notification messages received at two different service subscriber messaging devices.

FIG. 5a schematically illustrates a display of an exemplary interface for viewing an instant message 500, in a frame 502 of the on-line computer 40. The instant message 500 permits the subscriber to return a call treatment option for an inbound call. The frame 502 includes a body 504 having two sections: an inbound call notification message section 506 and a call treatment options menu section 508. The inbound call notification message section 506 indicates that a telephone call is pending from an unknown and unrecognized directory number, and provides the dialed digits found in the redirecting number field or the called party number field. As much information regarding the inbound call as is available may be displayed in the inbound call notification message section 506.

The call treatment options menu section 508 provides a list of available options, including four telephone numbers and a voice mail server, all of which may be associated with directory numbers in the subscriber's database 34. A default call treatment option may be associated with a time of day/day of week schedule, or may otherwise be assigned. The default currently supplied is the work telephone. The subscriber therefore has the option of selecting a checkbox 510 associated with receiving the call at one of these addresses, and then issuing the directive using a reply button 512. However the subscriber has selected button 514, which triggers presentation of a number selection field 516. The number selection field 516 prompts the subscriber to enter a directory number for the call. The service subscriber is further presented with an option for accessing a directory to identify the directory number, using directory button 520 or the number selection field 516, however a directory number is entered manually, in this example.

Figure 5B:
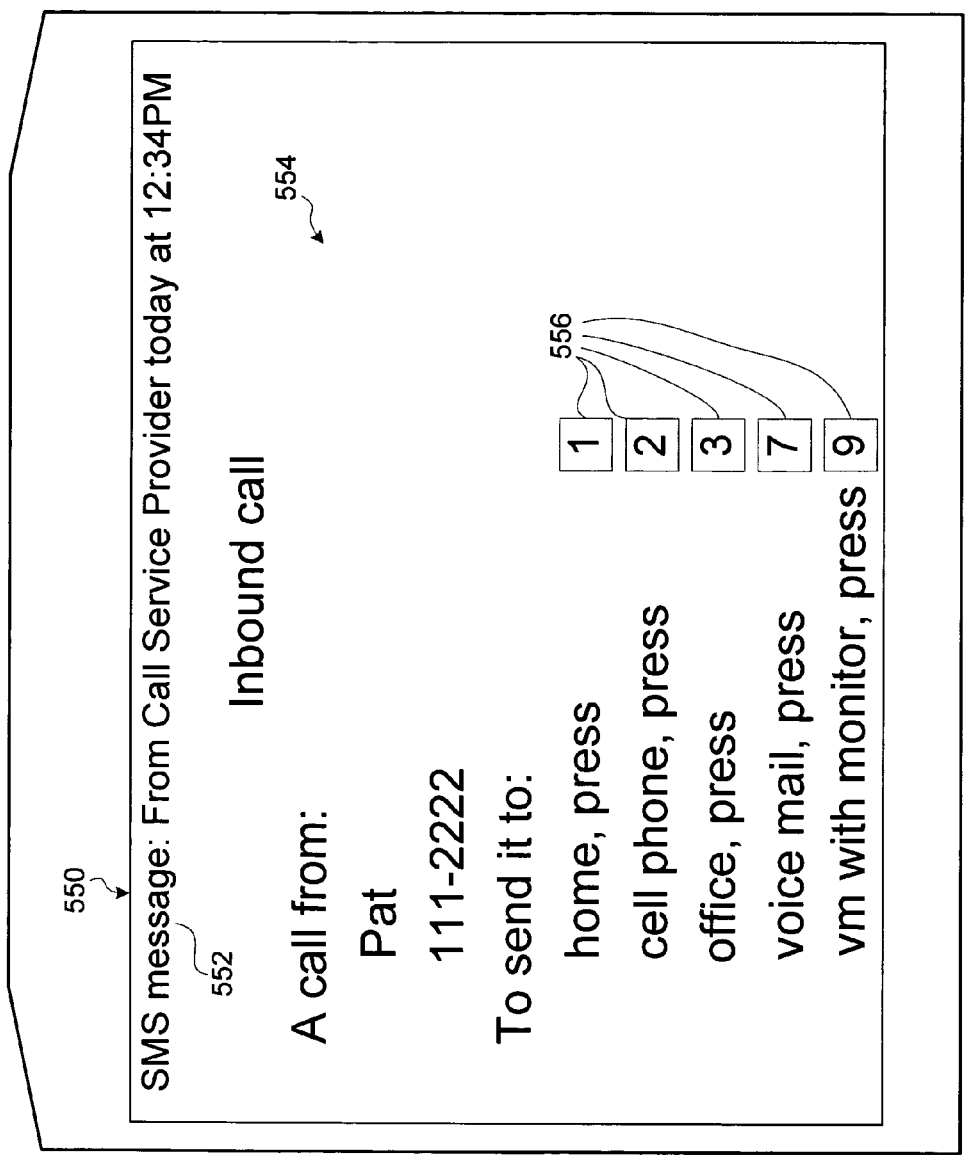

FIG. 5b schematically illustrates a short message service (SMS) message embodying an inbound call notification message in accordance with an embodiment of the invention. The cellular telephone 24 has a display screen 550 that permits the subscriber to view a SMS message. The SMS message is provided with a banner 552 identifying the source of the SMS message, and the time it was received. The SMS message also includes a message body 554 that indicates that the message is an inbound call notification message and that the call is from Pat, and shows Pat's number. The message body 554 further indicates that by pressing a respective number on a keypad of the cellular telephone (556), respective call treatment options can be selected for the call. Specifically the subscriber is presented with five options: to receive the call at home, to receive the call at the cellular telephone 24, to receive the call at the office, or to send the call to voice mail, with or without monitoring. It will be appreciated by those skilled in the art that some cellular telephones are known to provide automatic replies to SMS messages, indicating a selection by the service subscriber, or to indicate that the service subscriber is not available. This feature is preferably used to permit the CCA 12 to receive a response within a predetermined time limit. Alternatively, in accordance with known two-way SMS messaging, a response to the inbound call notification message may be used to permit the subscriber to enter a selected telephone number for receiving the call in accordance with a prescribed protocol.

The invention has therefore been described in relation to four parts, a system of the invention and its environment, methods for directing a call to an enhanced ISUP trunk, methods for parking the call, and methods for reconnecting the call in accordance with instructions from a service subscriber.

The embodiments of the invention described above are intended to be exemplary only. The scope of the invention is therefore intended to be limited solely by the scope of the appended claims.

We claim:

1. A method for providing an inbound call control service to a public switched telephone network (PSTN) inbound call control service subscriber, the method comprising:

configuring a directory number of the inbound call control service subscriber as a locally ported directory number in accordance with a Local Number Portability deployment, so that all calls to the directory number are routed through the PSTN to a call service node (CSN) that is a virtual service switching point in the PSTN;

receiving a call initiation message at the CSN, the call initiation message being associated with a call from a caller who dialed the locally ported directory number of the inbound call control service subscriber;

extracting a called number from the call initiation message, and using the called number to identify the inbound call control service subscriber associated with the called number by using the called number in a query to retrieve an inbound call control service subscriber profile that stores default information about how calls to the inbound call control service subscriber are to be handled;

issuing an inbound call notification message over a messaging network from the CSN to at least one messaging device operated by the inbound call control service subscriber, the inbound call notification message providing information related to the inbound call and requesting that the inbound call control service subscriber select a call treatment option for the inbound call;

while waiting for a reply to the inbound call notification message, modifying the inbound call initiation message to forward the call to a call parking facility associated with the inbound call service, and forwarding the modified inbound call initiation message from the CSN through the PSTN to forward the call to the call parking facility;

receiving from the inbound call control service subscriber a reply to the inbound call notification message indicating the call treatment option selected by the inbound call control service subscriber in response to the inbound call notification message;

controlling the parked call by sending a call release message from the CSN through the PSTN to the call parking facility to release the call from the call parking facility; and further controlling the call using call control messages sent from the CSN through the PSTN to control the released call in accordance with the call treatment option selected by the inbound call control service subscriber in response to the inbound call notification message.

2. The method as claimed in claim 1 wherein prior to receiving the call initiation message at the CSN, the method further comprises steps of:

receiving a dialed number at a service switching point that serves a calling party that initiated the inbound call;

translating the dialed number and determining that the dialed number is the locally ported number;

querying a service control point for routing instructions for completing the call to the dialed number; and formulating the call initiation message in response to receipt of the routing instructions from the service control point.

3. The method as claimed in claim 2 wherein formulating the call initiation message comprises formulating an Initial Address Message containing a conversion number and a routing code for routing the Initial Address Message to the CSN.

4. The method as claimed in claim 1 wherein issuing the inbound call notification message comprises:
   examining the inbound call control service subscriber profile to identify at least one messaging network address specified by the inbound call control service subscriber; and
   formulating and sending an inbound call notification message to each messaging network address specified in the inbound call control service subscriber profile, a format of each inbound call notification message being determined by characteristics of the messaging network through which the inbound call notification message is sent.

5. The method as claimed in claim 1 wherein routing the call to a call parking facility comprises forwarding the call to an announcement player that requests that the caller wait while the call is being processed.

6. The method as claimed in claim 1 wherein routing the call to a call parking facility comprises forwarding the call to a voice mail box.

7. The method as claimed in claim 6 wherein the reply received from the inbound call control service subscriber requests voice mail monitoring and the method further comprises:
   activating a trunk monitor connected to a trunk facility through which the call is routed; converting monitored content into a format compatible with a one of the at least one client device from which the reply was received; and
   forwarding the converted monitored content to the client device from which the reply was received, to permit the inbound call control service subscriber to listen to the voice mail message in real time.

8. The method as claimed in claim 7 wherein converting monitored content comprises converting pulse code modulated data to a streaming audio format.

9. The method as claimed in claim 6 wherein routing the call to a call parking facility comprises:
   extracting the called number from the call initiation message and using the called number in a query to retrieve the service subscriber profile;
   extracting a calling party number from the call initiation message;
   searching the service subscriber profile to determine whether the calling party number is associated with a specific voice mail box to which the call is to be forwarded; and
   if the calling party number is associated with a specific voice mail box, routing the inbound call to the specific voice mail box, otherwise forwarding the call to one of an announcement player and a default voice mail box specified in the service subscriber profile.

10. The method as claimed in claim 9 wherein routing the call to the voice mail box comprises modifying the call initiation message by inserting an address of the voice mail box into a called number field of the call initiation message, and inserting an inbound call control service subscriber telephone number associated with the voice mail box in a redirecting number field of the call initiation message, if the inbound call control subscriber telephone number associated with the voice mail box is different from the telephone number in the original called number field of the call initiation message.

11. The method as claimed in claim 1 wherein controlling the call using call control messages sent from the CSN in accordance with the call treatment option selected by the inbound call control service subscriber in response to the inbound call notification message comprises reconnecting the call to a telephone number specified in the reply, if the reply is received before a predetermined period of time lapses, and applying a default call treatment option specified in the service subscriber profile if the reply is not received before the predetermined period of time lapses.

12. The method as claimed in claim 11 wherein the default call treatment option is determined by a time of day and day of week.

13. The method as claimed in claim 11 wherein the default call treatment option is forwarding the call to a voice mail box.

14. The method as claimed in claim 11 wherein reconnecting the call to a telephone number specified in the reply comprises one of reconnecting the call to a directory number specified in the service subscriber profile; reconnecting the call to a service-subscriber-selected one of a plurality of telephone numbers specified in the service subscriber profile; and, reconnecting the call to a telephone number supplied by the inbound call control service subscriber in the reply to the inbound call notification message.

15. The method as claimed in claim 1 further comprising storing a number of a calling party that initiated the inbound call so that if the reply to the inbound call notification is received after the calling party has terminated the inbound call, the CSN can use information in the reply and the stored number of the calling party to automatically establish a call between the inbound call control service subscriber and the calling party.

16. A method for providing single number service to a public switched telephone network (PSTN) single number service subscriber, comprising:
   configuring a directory number of the single number service subscriber as a locally ported directory number in accordance with a Local Number Portability deployment, so that all calls to the locally ported directory number are routed through the PSTN to a call service node (CSN) that is a virtual service switching point in the PSTN;
   receiving a call initiation message at the CSN, the call initiation message being associated with a call from a caller who dialed the locally ported directory number;
   extracting a called number from the call initiation message, and using the called number in a query to retrieve a service subscriber profile that stores default information about how calls to the single number service subscriber are to be handled;
   issuing an inbound call notification message over a messaging network from the CSN to at least one messaging device operated by the single number service subscriber, the inbound call notification message providing information related to the inbound call and requesting that the single number service subscriber select a call treatment option for the inbound call;
   while waiting for a reply to the inbound call notification message, routing the call initiation message from the CSN through the PSTN to forward the call to a call parking facility in the PSTN that is associated with the single number service;
   receiving from the single number service subscriber a reply to the inbound call notification message indicating the call treatment option;
   further controlling the inbound call by sending call control messages from the CSN through the PSTN to control the inbound call in accordance with the call treatment option selected by the single number service subscriber in response to the inbound call notification message.

17. The method as claimed in claim 16 wherein prior to receiving the call initiation message at the CSN, the method further comprises steps of:
receiving a dialed number at a service switching point that serves the calling party who dialed the locally ported directory number;
translating the dialed number and determining that the dialed number is the locally ported directory number;
querying a service control point for routing instructions for completing the call to the dialed number; and
formulating the call initiation message in response to receipt of the routing instructions from the service control point.

18. The method as claimed in claim 16 wherein the call initiation message comprises an Initial Address Message containing a conversion number and a routing code for routing the Initial Address Message to the CSN.

19. The method as claimed in claim 16 wherein the default information about how calls to the simile number service subscriber are to be handled comprises:
a plurality of directory numbers respectively associated with the single number service subscriber and other default information about how calls to the single number service subscriber are to be handled.

20. The method as claimed in claim 19 wherein issuing an inbound call notification message comprises:
examining the service subscriber profile to identify at least one messaging network address specified by the single number service subscriber; and
formulating and sending an inbound call notification message to each messaging network address specified in the service subscriber profile, a format of each inbound call notification message being determined by characteristics of the messaging network through which the inbound call notification message is sent, and each inbound call notification message containing a list of the directory numbers associated with the simile number service subscriber.

21. The method as claimed in claim 20 further comprising formulating the inbound call notification message to include an option to permit the single number service subscriber to specify a directory number that is different from the plurality of directory numbers in the service subscriber profile.

22. The method as claimed in claim 20 wherein routing the call initiation message from the CSN to forward the call to a call parking facility comprises routing the call to an announcement player that requests that the caller wait while the call is being processed.

23. The method as claimed in claim 18 wherein routing the call initiation message from the CSN to forward the call to a call parking facility comprises routing the call to a voice mail box.

24. The method as claimed in claim 23 wherein routing the call initiation message from the CSN to route the call to a call parking facility comprises:
extracting the conversion number from the call initiation message and using the conversion number in a query to retrieve the service subscriber profile;
extracting a calling party number from the call initiation message;
searching the caller profile to determine whether the calling party number is associated with a specific voice mail box to which the call is to be forwarded; and
if the calling party number is associated with a specific voice mail box, routing the call initiation message from the CSN to forward the inbound call to the specific voice mail box, otherwise routing the call initiation message from the CSN to forward the call to one of an announcement player and a default voice mail box specified in the service subscriber profile.

25. The method as claimed in claim 24 wherein routing the call initiation message from the CSN to forward the call to the voice mail box comprises modifying the call initiation message by inserting an address of the voice mail box into a called party number field of the call initiation message, and inserting a one of the single number subscriber telephone numbers associated with the voice mail box in a redirecting number field of the call initiation message, if the single number service subscriber telephone number associated with the voice mail box is different from the client telephone number in the called number field of the call initiation message.

26. The method as claimed in claim 19 wherein further controlling the call by sending call control messages from the CSN comprises sending a call release message to release the call from the call parking facility and sending a call control message from the CSN to forward the call to the directory number specified in the reply, if the reply is received before a predetermined period of time lapses, and sending a call control message from the CSN to forward the call to a single number service subscriber directory number specified in the service subscriber profile if the reply is not received before the predetermined period of time lapses.

27. The method as claimed in claim 26 wherein the single number service subscriber directory number is selected based on a time of day and day of week.

28. The method as claimed in claim 27 further comprising storing a number of a calling party so that if the reply is received after the calling party has terminated the call, the CSN can use the directory number specified in the reply, and the stored number of the calling party, to send call control messages from the CSN to automatically establish a call between the single number service subscriber and the calling party.

* * * * *

UNITED STATES PATENT AND TRADEMARK OFFICE
CERTIFICATE OF CORRECTION

PATENT NO.        : 7,636,431 B2                                   Page 1 of 1
APPLICATION NO. : 10/806135
DATED             : December 22, 2009
INVENTOR(S)       : Lloyd L. Williams et al.

It is certified that error appears in the above-identified patent and that said Letters Patent is hereby corrected as shown below:

Column 21, line 21, claim 19, delete "simile" and insert therefor -- single --;

Column 21, line 39, claim 20, delete "simile" and insert therefor -- single --.

Signed and Sealed this

Twenty-first Day of September, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,636,431 B2 | Page 1 of 1 |
| APPLICATION NO. | : 10/806135 | |
| DATED | : December 22, 2009 | |
| INVENTOR(S) | : Williams et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 905 days.

Signed and Sealed this

Ninth Day of November, 2010

David J. Kappos
*Director of the United States Patent and Trademark Office*